United States Patent
Huang et al.

(10) Patent No.: US 9,497,437 B2
(45) Date of Patent: Nov. 15, 2016

(54) DIGITAL REFOCUSING METHOD

(71) Applicant: NATIONAL TSING HUA UNIVERSITY, Hsinchu (TW)

(72) Inventors: Chao-Tsung Huang, Hsinchu (TW); Jui Chin, Hsinchu (TW)

(73) Assignee: NATIONAL TSING HUA UNIVERSITY, Hsinshu (TW)

( * ) Notice: Subject to any disclaimer, the term of this patent is extended or adjusted under 35 U.S.C. 154(b) by 0 days.

(21) Appl. No.: 14/684,456

(22) Filed: Apr. 13, 2015

(65) Prior Publication Data

US 2016/0165206 A1    Jun. 9, 2016

(30) Foreign Application Priority Data

Dec. 3, 2014 (TW) .............................. 103142032 A

(51) Int. Cl.
| | |
|---|---|
| G06K 9/00 | (2006.01) |
| H04N 13/00 | (2006.01) |
| G06T 5/50 | (2006.01) |
| G06T 5/30 | (2006.01) |
| G06T 3/40 | (2006.01) |

(52) U.S. Cl.
CPC ......... H04N 13/0022 (2013.01); G06T 3/4007 (2013.01); G06T 5/30 (2013.01); G06T 5/50 (2013.01); H04N 13/0011 (2013.01); H04N 2013/0081 (2013.01)

(58) Field of Classification Search
CPC ............. H04N 13/0022; H04N 13/0011; H04N 2013/0081; G06T 3/4007; G06T 5/30; G06T 5/50
USPC ........................................ 382/154, 284, 300
See application file for complete search history.

(56) References Cited

U.S. PATENT DOCUMENTS

| | | | | |
|---|---|---|---|---|
| 8,290,358 | B1 * | 10/2012 | Georgiev | G03B 35/10 396/326 |
| 2013/0106837 | A1 * | 5/2013 | Mukherjee | H04N 13/0018 345/419 |
| 2013/0308035 | A1 * | 11/2013 | Hiasa | H04N 5/2254 348/340 |
| 2014/0085435 | A1 * | 3/2014 | Doyen | H04N 13/0011 348/51 |
| 2014/0184754 | A1 * | 7/2014 | Suh | H04N 13/0232 348/50 |

* cited by examiner

Primary Examiner — Daniel Mariam
(74) Attorney, Agent, or Firm — CKC & Partners Co., Ltd.

(57) ABSTRACT

A digital refocusing method includes: a plurality of images corresponding to multiple views in a scene are obtained, the images include a central view image and at least one non-central view image; a pixel shift or a pixel index shift is performed to the non-central view image; a line scan along a pre-determined linear path is performed to the central view image and the non-central view images to obtain corresponding pixels of the central view image and corresponding pixels of the non-central view images; view interpolation based on the disparities defined in a disparity map is performed, target pixels corresponded to a novel view image are obtained from the corresponding pixels of the central view image and the corresponding pixels of the non-central view according to a target disparity; and a refocused novel view image is obtained by averaging and compositing the target pixels of novel views.

9 Claims, 7 Drawing Sheets

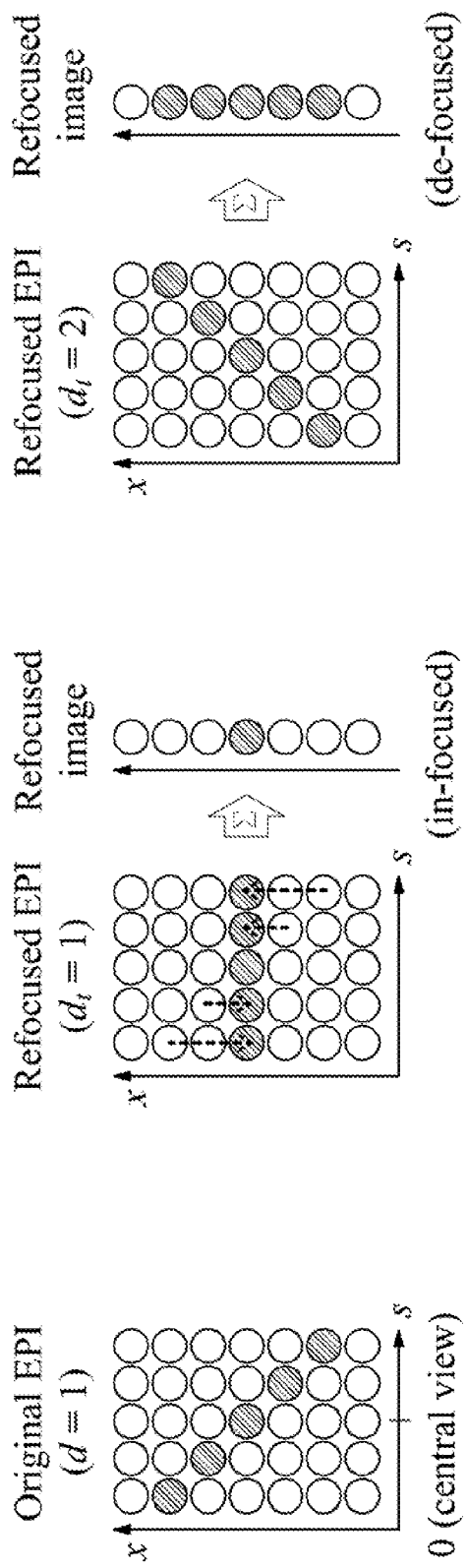

DIGITAL REFOCUSING METHOD

RELATED APPLICATIONS

The application claims priority to Taiwan Application Serial Number 103142032, filed on Dec. 3, 2014, which is herein incorporated by reference.

BACKGROUND

Technical Field

The present disclosure relates to a digital refocusing method. More particularly, the present disclosure relates to a digital refocusing method that the refocused novel view images are constructed through performing one-dimensional line scans and view interpolation based on a central view.

Description of Related Art

Digital refocusing is a rising method of great potentiality in photograph taking. The digital refocusing method enables photo taking first and then focusing. As such, a photographer may take an image first without performing typical complicated refocusing actions. In this regard, the photographer is allowed to capture a momentary image without encountering the problem like unintentional defocusing. Further, multiple images having various DOFs (Depth of Fields) may be obtained through an algorithm process of the digital refocusing method.

The digital refocusing method can be implemented through a reconstruction of sub-images of a light-field image. The light-field image can be formed by compositing multiple images corresponding to multiple views. Through the images, all information like directions, intensities or positions of the light that enters from an object to a lens of a camera can be obtained, in which the images constructing the light-field image are called sub-images.

In a conventional light-field refocusing method, a refocused image is obtained by averaging the sub-images in view of a target disparity. However, if the sampling number of the sub-images is insufficient, serious aliasing effect of the refocused image will occur. For eliminating the aliasing effect, view interpolation is usually performed to produce sufficient number of sub-images, and then the digital refocusing is performed through an algorithm of computer program.

Although the view interpolation method can be used for obtaining anti-aliased refocused images that having various DOFs, the algorithm behind the view interpolation is complicated and requires lots of sub-images for preventing aliasing effect. Thus the operation efficiency becomes low and the equipment cost raises.

SUMMARY

According to one aspect of the present disclosure, a digital refocusing method is provided. The digital refocusing method includes: a plurality of images corresponding to multiple views in a scene are obtained, wherein the images includes a central view image and at least one non-central view image; a disparity map corresponding to the central view image is obtained; a pixel shift or a pixel index shift is performed to each non-central view image; a line scan along a pre-determined linear path is performed to the central view image and a non-central view image to obtain corresponding pixels of the central view image and corresponding pixels of the non-central view image; view interpolation based on disparities defined in the disparity map is performed, target pixels are obtained from the corresponding pixels of the central view image and the corresponding pixels of the non-central view image according to a target disparity, wherein the target pixels correspond to a novel view; and a refocused image is obtained by averaging and compositing the target pixels of a plurality of novel view images, wherein the view interpolation comprises: obtaining a temporary pixel by mapping the corresponding pixels of the central view to the novel view according to the target disparity; if a distance there is only one target pixel of the novel view between one of the two neighboring target temporary pixels, the target pixel is derived by performing linear interpolation on the two temporary pixels; if some pixel of the central view is occluded in the novel view, and a hole filling is applied.

According to another aspect of the present disclosure, another digital refocusing method is provided. The digital refocusing method includes: line scans along a first linear path are performed to a central view image and non-central view images in a scene, then first novel view pixels corresponding to first novel views are obtained through performing first view interpolation to the corresponding pixels of the central view image and the corresponding pixels of the non-central view images, and then first novel view images are constructed by compositing the first novel view pixels; line scans along a second linear path are performed to the central view image and non-central view images, then second novel view pixels corresponding to second novel views are obtained through performing second view interpolation to the corresponding pixels of the central view image and the corresponding pixels of the non-central view images, and then second novel view images are constructed by compositing the second novel view pixels; line scans along a third linear path is performed to the first novel view images and the second novel view images, then third novel view pixels corresponding to third novel views are obtained through performing third view interpolation to the corresponding pixels of the first novel view images and the corresponding pixels of the second novel view images, and then third novel view images are constructed by compositing the third novel view pixels; wherein a triangle view distribution is constructed by the first novel view images, the second novel view images and the third novel view images, and the triangle view distribution is expanded to form two-dimensional novel view images covering all viewpoints.

BRIEF DESCRIPTION OF THE DRAWINGS

The present disclosure can be more fully understood by reading the following detailed description of the embodiment, with reference made to the accompanying drawings as follows:

FIG. 2A to 2E are schematic views showing various conditions of the digital refocusing method of the present disclosure;

DETAILED DESCRIPTION

Figure 1:
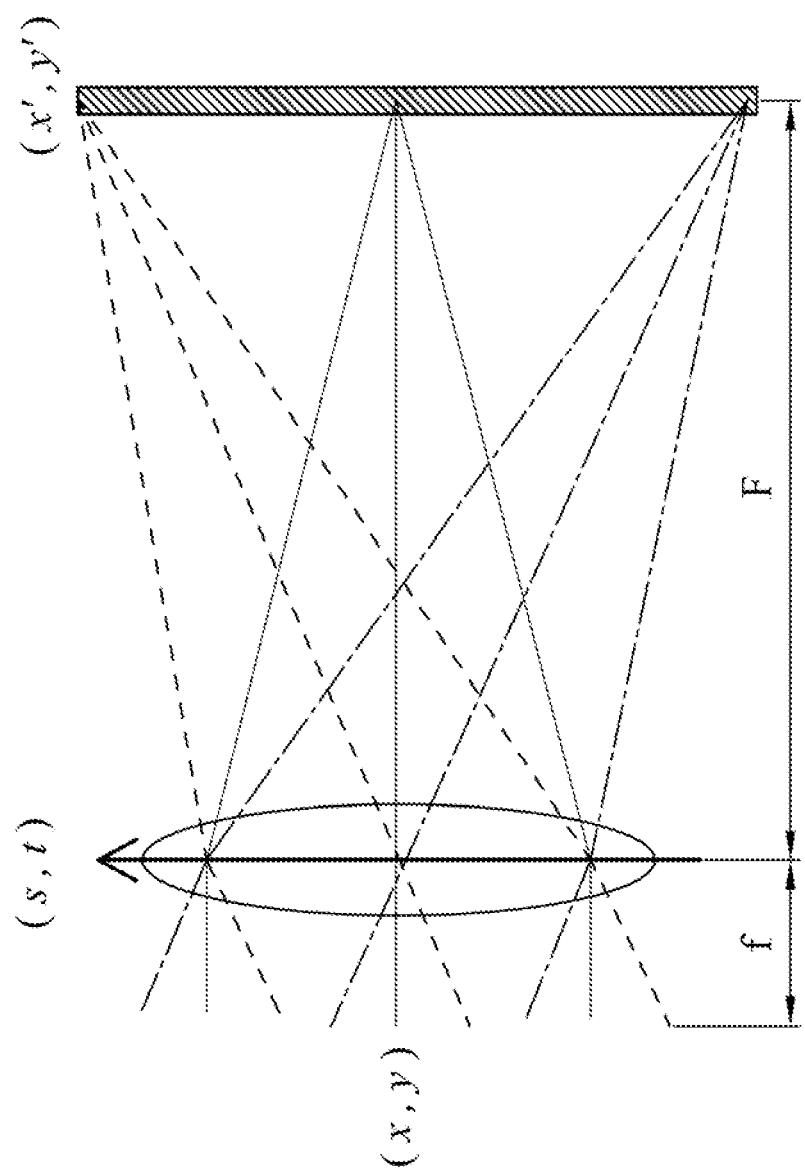
FIG. 1 is a schematic view showing a 4-D light-field applied in the present disclosure.

Reference will now be made in detail to the present embodiments of the disclosure, examples of which are illustrated in the accompanying drawings. Wherever possible, the same reference numbers are used in the drawings and the description to refer to the same or like parts.

The present disclosure provides a digital refocusing method based on 1-D line scans and central-view-based view interpolation. Therefore, high operation efficiency can be obtained while retaining the quality of the images.

FIG. 1 is a schematic view showing a 4-D light field applied in the present disclosure. Basic concept of a light-field camera or a plenoptic camera is that any light in a space can be represented by a crossover point between the light and any two planes. Accordingly, in FIG. 1, in a multi-view (or camera-array) model, a light-field L at camera (or lens) position (s, t) and projecting plane position (x, y) can be represented by a 4-D function L(s, t, x, y). Furthermore, in a light-field camera model, point (s, t) can be viewed as a position of an aperture, and (x', y') is an image sensor position when the lens is focused infinitely. Therefore, a light-field L' can be represented by L'(s, t, x', y').

A relationship between the light-field L and the light-field L' can be represented by the following formula:

$$L(s, t, x, y) = L'\left(s, t, x' = x \cdot \frac{f}{F}, y' = y \cdot \frac{f}{F}\right) \quad (1)$$

In the formula (1), f represents a focal length of each camera in the camera array; F represents a focal length of the light-field camera. In the embodiments, a disparity will be introduced to describe the digital refocusing method in the present disclosure. The disparity can be represented by the following formula:

$$d = \frac{\Delta s}{\Delta x} \times \frac{f}{z} \quad (2)$$

In the formula (2), $\Delta s$ represents a view baseline, $\Delta x$ represents pixel size, f represents a focal length, and z represents a scene depth. In the formula (2), $$\frac{\Delta s}{\Delta x}$$

can be viewed as a maximum possible image resolution, $$\frac{f}{z}$$

can be view as a magnification factor. Therefore, when the resolution is higher or the size of the image sensor is larger, the disparity is greater.

The purpose of digital refocusing is to synchronize the refocused image in any focused plane. The refocused image is obtained by performing view interpolation to digitalized sub-images (e.g. images captured by the image sensor), and the sub-images are from capturing the light field of the original scene.

Figures 2D, 2E:
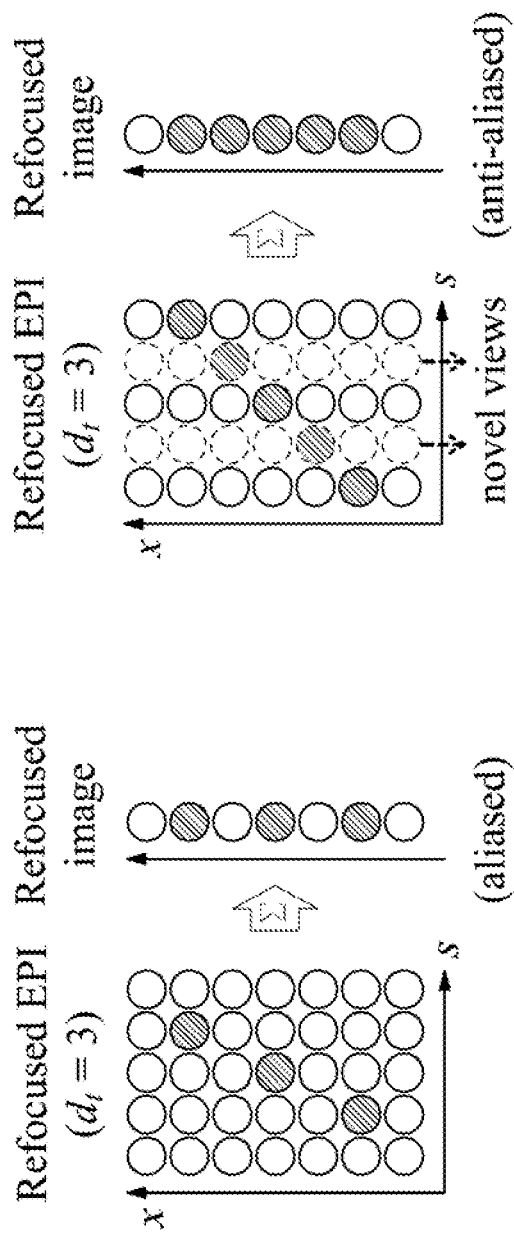

FIGS. 2A to 2E are schematic views showing various situations of the digital refocusing method of the present disclosure. In FIG. 2A, a pixel refocusing along a straight line from a central view in an Epipolar Plane Image is shown. In FIG. 2A, when an original disparity of an original image (d=1) is equal to a target disparity of a refocused image (dt=1), an in-focused situation occurs. In FIG. 2B, when the target disparity of the refocused image is 2, a de-focused situation occurs. In FIG. 2C, when the target disparity of the refocused image is 3, aliasing effect in the refocused image appears and reduces the quality of the image, as shown in FIG. 2D. For eliminating aliasing effect occurred in the image as in FIG. 2D, various view interpolation methods have been proposed. For example, in FIG. 2E, in a situation that the target disparity is 3, performing view interpolation to generate two novel views can eliminate aliasing effect of the refocused image.

Conventionally, lots of images corresponding to multiple views should be obtained for eliminating the alias effect, thereby increasing complexity of the algorithm and reducing the operation efficiency. The digital refocusing method of the present disclosure can increase operation efficiency while retaining the quality of the refocused image. The advantages of the digital refocusing method are (a) view interpolation is performed according to a central-view-based line scan; and (b) line scan is used to obtain 2-D refocused image. In the specification, the digital refocusing method that utilizing line-scan-based view interpolation will be introduced in more detail, since this is a major difference from the prior arts.

Figure 3:
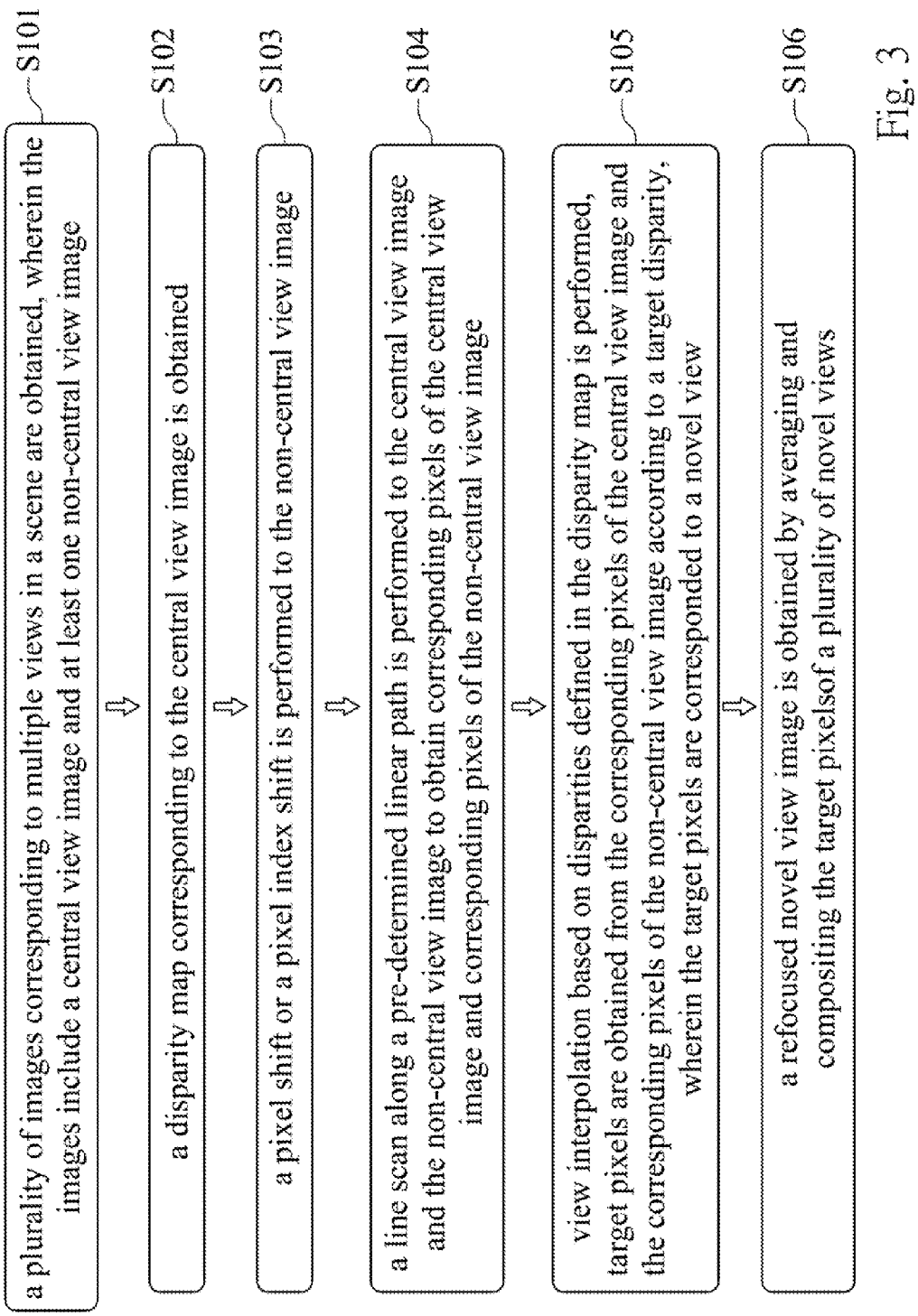
FIG. 3 is a flow chart of the digital refocusing method according to one embodiment of the present disclosure.

FIG. 3 is a flow chart of the digital refocusing method according to one embodiment of the present disclosure. In FIG. 3, the digital refocusing method includes the following steps.

Step S101, a plurality of images corresponding to multiple views in a scene are obtained, wherein the images includes a central view image and at least one non-central view image.

Steps S102, a disparity map corresponding to the central view image is obtained.

Step S103, a pixel shift or a pixel index shift is performed to the non-central view image.

Step S104, a line scan along a pre-determined linear path is performed to the central view image and the non-central view image to obtain corresponding pixels of the central view image and corresponding pixels of the non-central view image Step S105, a view interpolation based on disparities defined in the disparity map is performed; target pixels are obtained from the corresponding pixels of the central view image and the corresponding pixels of the non-central view image according to a target disparity, wherein the target pixels correspond to a novel view.

Step S106, a refocused novel view image is obtained by averaging and compositing the target pixels of a plurality of novel views.

In Step S101, the images of the multiple views in the same scene can be obtained through a light-field image capturing device. Commonly the light-field image capturing device includes a lens array for obtaining light-filed information of a scene, and then the light-field information is captured by an image sensor. Then the digitalized light-field sub images are formed.

In Step S102, one of the important technical features of the digital refocusing method of the present disclosure is disclosed. In the digital refocusing method of the present disclosure, only the disparity map of the central view image is considered, and then the pixels of the refocused image based on novel views can be obtained in accordance with the disparity map.

Steps S103 to S105 are different from the conventional digital refocusing methods. In the conventional digital refocusing methods, the pixels used for view interpolation are accessed irregularly based on the disparity. In more detail, the scan path for capturing the pixel points is not fixed. Moreover, in the conventional digital refocusing methods, the view interpolation is performed first, and then followed by the pixel shift. The aforementioned step order will cause additional blur for the refocused image. In contrast, in the digital refocusing method of the present disclosure, a pixel shift or a pixel-index shift is performed first, and then followed by the view interpolation. Therefore the additional blur will not appear. Furthermore, when performing the view interpolation, the digital refocusing method of the present disclosure access pixels regularly along a pre-determined linear path. Compared with the situation that the pixels are irregularly accessed in the conventional methods, the number of the accessed pixels can be reduced in the digital refocusing method of the present disclosure by accessing the pixels along the pre-determined linear path.

In Step S105, the view interpolation consists of two steps: forward mapping and hole filling. The forward mapping maps each pixel of the central view to a corresponding temporary pixel on the novel view in accordance with a selected target disparity. If there is only one target pixel of the novel view between two neighboring temporary pixels, the target pixel is derived by performing linear interpolation on the two temporary pixels. Otherwise, it means some pixel of the central view is occluded in the novel view, and hole filling will be applied. In conventional view interpolation methods, the hole filling usually involve complex process to render the occluded regions correctly. In contrast, in the present disclosure the target pixels in these occluded regions are derived by directly mapping the corresponding pixels of the non-central view to the novel view using an estimated disparity which is the closest available one on the disparity map. This simple operation saves lots of computation and is based on the observation that the novel view images will not be viewed directly but will be averaged for the refocusing. Also, they will be averaged with the objects occluding them. Therefore, the detail of these occluded regions is not important in the refocused image.

In the aforementioned view interpolation, most target pixels are derived based on the central view image. Only the occluded regions will use the non-central view image. Therefore, the number of access pixels be reduced, thereby increasing the operation efficiency.

Figure 4:
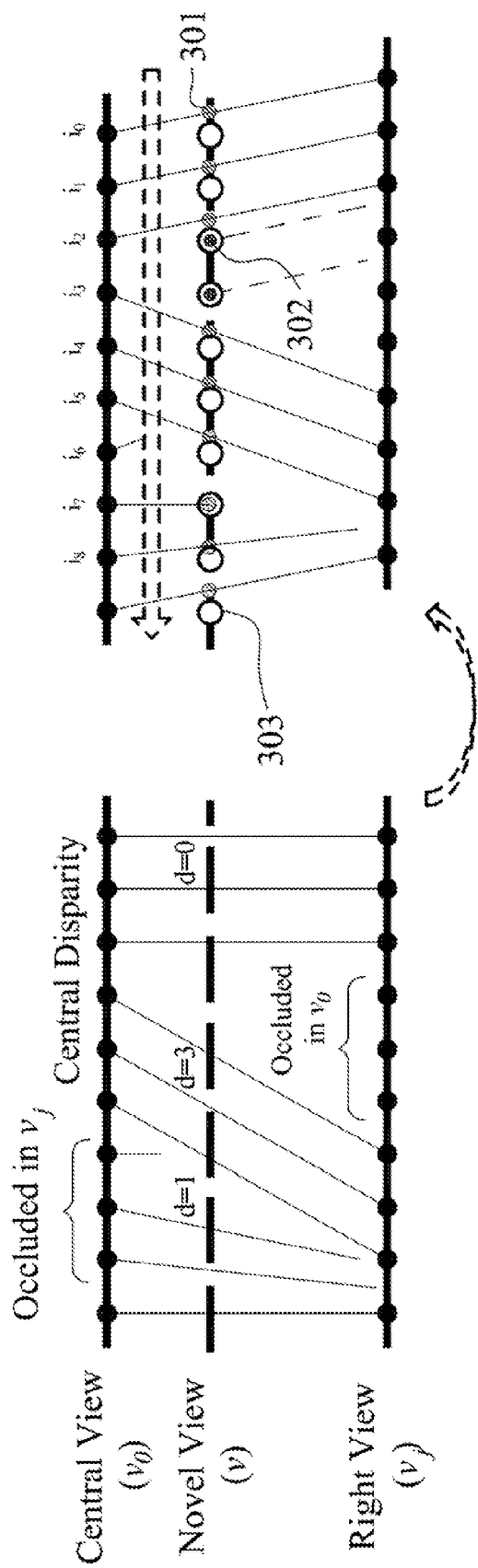
FIG. 4 is a schematic view showing the view interpolation in FIG. 3 (S103~S106)
Figure 5:
FIG. 5 is a schematic view showing the obtained multiple images corresponding to multiple views in a scene in FIG. 3.

For more detail, referring to FIG. 4 and FIG. 5. FIG. 4 is a schematic view showing the view interpolation in FIG. 3. FIG. 5 is a schematic view showing the multiple images corresponding to multiple views in a scene in FIG. 3. FIG. 4 shows how the present disclosure scans and generates one line of the target pixels of a novel view image (the novel view is represented by v). As mentioned previously in steps S101 and S102, a central view image, non-central view images and a disparity map corresponding to the central view image are required (in FIG. 4, the central view is represented by $v_0$). In the embodiment, right view images are taken for example (right view is represented by $v_j$), and the case for left view images can be implemented by symmetry. For example, in FIG. 5, if images of 5×5 views are taken into consideration, then a central view image 101 and right view images 102 are selected.

And then, as mentioned previously in steps S103 to S104, a pixel shift or a pixel index shift is performed to the all non-central view images, and then a line scan along a pre-determined linear path is performed to the central view image and the non-central view images. In FIG. 4, pixel indexes $i_0$~$i_8$ are uses for example with their disparities d=1, d=3, and d=0 on the left of FIG. 4). Some cases of occlusion are also shown. As shown in the right part of FIG. 4, the pixel shift or the pixel index shift has been performed to the right view image 102, and then the line scan along a horizontal linear path has been performed from right to left. In one example, the linear path can also be a vertical linear path or an oblique linear path. When the linear path is an oblique linear path, an angle between the oblique linear path and a horizontal virtual line is 45 degrees.

As mentioned in step S105, view interpolation is performed to form the target pixels, i.e. the pixel 303 in FIG. 4. First, mapping each pixel of the central view image to the corresponding temporary pixel 301 by forward mapping. Then, if there is only one target pixel 303 between two neighboring temporary pixels, the target pixel is derived by performing linear interpolation on the two temporary pixels. If not, it means that the target pixel, e.g. 302, is occluded in the central view. The target pixel 302 can be obtained by performing a linear interpolation to the corresponding pixels of the right view image.

From above, it is shown that in the digital refocusing method of the present disclosure, novel view pixels can be obtained by the line-scan-based view interpolation. And then the final refocused image can be obtained by averaging all novel view pixels without any shift or interpolation. Furthermore, the in-focused pixels are equal to the original central view pixels for maintaining the sharpness. In contrast, the conventional methods first perform view interpolation and then a shift interpolation, which results in additional blur. The digital refocusing method of the present disclosure utilizes regular pixel access and simple interpolation, and thus the operation efficiency can be increased while retaining the quality of the image.

Figure 6B:
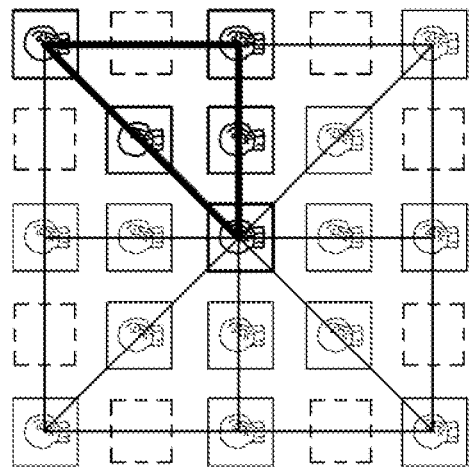
FIG. 6B is a schematic view showing that a triangle expansion of the views of the digital refocusing method of FIG. 6A.
Figure 6A:
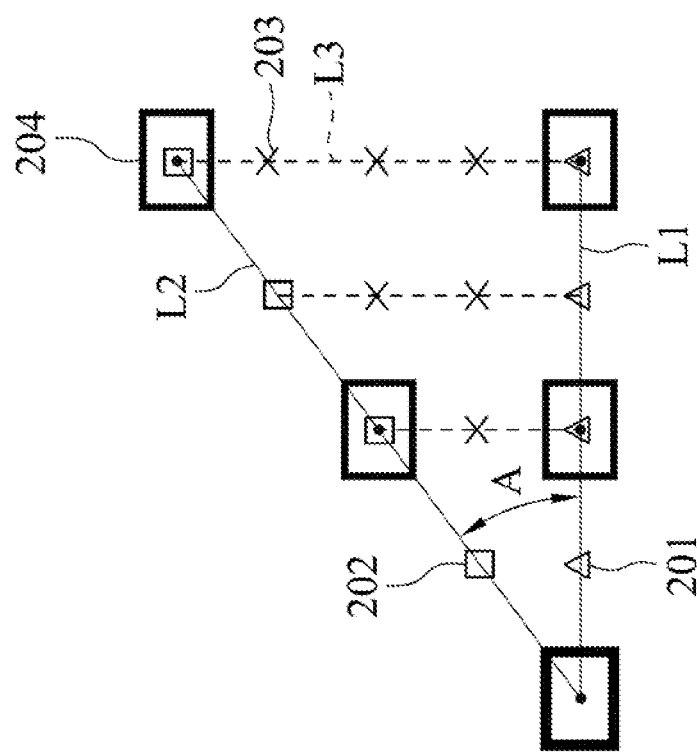
FIG. 6A is a schematic view showing a digital refocusing method according to another embodiment of the present disclosure.

FIG. 6A is a schematic view showing a digital refocusing method according to another embodiment of the present disclosure. FIG. 6B is a schematic view showing that a triangle expansion of the views of the digital refocusing method of FIG. 6A.

The digital refocusing method described in FIG. 6A and FIG. 6B is to expand the aforementioned one-dimensional view organization, or aperture, to two-dimensional, and the steps are as follows: (a) line scars along a first linear path are performed to a central view image and non-central view images in a scene, then first novel view pixels corresponding to first novel views are obtained through performing first view interpolation to the corresponding pixels of the central view image and the corresponding pixels of the non-central view images, and then first novel view images are constructed by compositing the first novel view pixels; (b) line scans along a second linear path are performed to the central view image and non-central view images, then second novel view pixels corresponding to second novel views are obtained through performing second view interpolation to the corresponding pixels of the central view image and the corresponding pixels of the non-central view images, and then second novel view images are constructed by compositing the second novel view pixels; and (c) line scans along a third linear path is performed to the first novel view images and the second novel view images, then third novel view pixels corresponding to third novel views are obtained through performing third view interpolation to the corresponding pixels of the first novel view images and the corresponding pixels of the second novel view images, and then third novel view images are constructed by compositing the third novel view pixels; wherein a triangle view distribution is constructed by the first novel view images, the second novel view images and the third novel view images, and the triangle view distribution is expanded to form two-dimensional novel view images covering all viewpoints.

In FIGS. 6A and 6B, more details to the aforementioned two-dimensional view organization are described, where a rectangular frame 204 represents an image captured by a light-field camera. First, as previously mentioned in FIG. 4, a first novel view image 201 (marked by triangles) can be obtained by performing first line scans for first view interpolation along a first linear path L1. The first linear path L1 can be a horizontal linear path. Similarly, a second novel view image 202 (marked by squares) can be obtained by performing second line scans for second view interpolation along a second linear path L2. The second linear path L2 can be an oblique linear path, and a 45-degree angle is formed between the second linear path L2 and the first linear path L1. Then, a third novel view image 203 (marked by crosses) can be obtained by performing third line scans for view interpolation along a third linear path L3 in accordance with the first novel view image 201 and the second novel view image 202. The third linear path L3 is perpendicular to the first linear path L1. The first novel view images 201, the second novel view images 202 and the third novel view images 203 form a triangle view distribution, and the triangle view distribution is expanded by symmetry to form two dimensional novel view images covering all viewpoints, as shown in FIG. 6B. By the aforementioned method, line-scan accessing is performed along pre-determined linear paths, therefore the complicated operations due to irregular access in the conventional methods can be reduced, and the operation efficiency can be increased.

To sum up, the digital refocusing method of the present disclosure has the following advantages: (a) central-view based line scan and view interpolation; and (b) one-dimensional access can be expanded to construct refocused images with a two-dimensional aperture. Therefore, the digital refocusing method can increase the operation efficiency and retaining the quality of the refocused images.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A digital refocusing method, comprising:
    obtaining a plurality of images corresponding to multiple views in a scene, wherein the images comprise a central view image and at least one non-central view image;
    obtaining a disparity map corresponding to the central view image;
    performing a pixel shift or a pixel index shift to the non-central view image;
    performing a line scan along a pre-determined linear path to the central view image and the non-central view image to obtain corresponding pixels of the central view image and corresponding pixels of the non-central view image;
    performing view interpolation based on disparities defined in the disparity map, obtaining target pixels from the corresponding pixels of the central view image and the corresponding pixels of the non-central view image according to a target disparity, wherein the target pixels are corresponded to a novel view; and
    obtaining a refocused novel view image by averaging and compositing the target pixels from a plurality of novel views;
    wherein the view interpolation comprises:
    obtaining a temporary pixel by mapping the corresponding pixels of the central view to the novel view according to the target disparity;
    if there is only one target pixel of the novel view between one of the two neighboring temporary pixels, the target pixel is derived by performing linear interpolation on the two temporary pixels;
    if some pixel of the central view is occluded in the novel view, the target pixels are derived by directly mapping the corresponding pixels of the non-central view to the novel view using an estimated disparity which is the closest available one on the disparity map.

2. The digital refocusing method of claim 1, wherein the images of the multiple views in the scene are obtained through a light-field image capturing device.

3. The digital refocusing method of claim 1, wherein the pre-determined linear path in the line-scan is a horizontal linear path or a vertical linear path.

4. The digital refocusing method of claim 1, wherein the pre-determined linear path in the line-scan is an oblique linear path.

5. The digital refocusing method of claim 4, wherein an angle between the oblique linear path and a horizontal virtual line is 45 degrees.

6. A digital refocusing method, comprising:
    performing line scans along a first linear path to a central view image and non-central view images in a scene, obtaining first novel view pixels corresponding to first novel views through performing first view interpolation to the corresponding pixels of the central view image and the corresponding pixels of the non-central view images, and then constructing first novel view images by compositing the first novel view pixels;
    performing line scans along a second linear path to the central view image and non-central view images, obtaining second novel view pixels corresponding to second novel views through performing second view interpolation to the corresponding pixels of the central view image and the corresponding pixels of the non-central view images, and then constructing second novel view images by compositing the second novel view pixels; and
    performing line scans along a third linear path to the first novel view images and the second novel view images, then obtaining third novel view pixels corresponding to third novel views through performing third view interpolation to the corresponding pixels of the first novel view images and the corresponding pixels of the second novel view images, and then constructing third novel view images by compositing the third novel view pixels, wherein a triangle view distribution is constructed by the first novel view images, the second novel view images and the third novel view images, and the triangle view distribution is expanded to form two-dimensional novel view images covering a one-dimensional view organization.

7. The digital refocusing method of claim 6, wherein the first linear path is a horizontal linear path, the second linear path is an oblique linear path, and an angle is formed between the first linear path and the second linear path.

8. The digital refocusing method of claim 7, wherein the angle is 45 degrees.

9. The digital refocusing method of claim 6, wherein the third linear path is perpendicular to the first linear path.

\* \* \* \* \*